United States Patent [19]

Kimura et al.

[11] Patent Number: 4,501,801
[45] Date of Patent: Feb. 26, 1985

[54] MAGNETIC RECORDING MEDIUM

[75] Inventors: Shigeo Kimura, Tagajo; Masashi Somezawa, Sendai; Yuji Hinoto; Hiroshi Yoshioka, both of Annaka, all of Japan

[73] Assignees: Sony Corporation; Shin-Etsu Chemical Co., Ltd., both of Tokyo, Japan

[21] Appl. No.: 551,040

[22] Filed: Nov. 14, 1983

[30] Foreign Application Priority Data

Nov. 19, 1982 [JP] Japan .................................. 57-204338

[51] Int. Cl.³ .......................... G11B 5/68; G11B 5/70; G11B 5/72
[52] U.S. Cl. ................................ 428/447; 252/62.54; 360/134; 360/135; 360/136; 427/128; 428/694; 428/695; 428/900
[58] Field of Search .............. 428/447, 695, 694, 900; 422/128; 360/134–136; 252/62.54

[56] References Cited

U.S. PATENT DOCUMENTS

| 4,007,313 | 2/1977 | Higuchi | 428/447 |
| 4,369,230 | 1/1983 | Kimura | 428/447 |
| 4,409,300 | 10/1983 | Ohkawa | 428/695 |
| 4,431,703 | 2/1984 | Somezawa | 428/447 |

Primary Examiner—Ellis P. Robinson
Attorney, Agent, or Firm—Hill, Van Santen, Steadman & Simpson

[57] ABSTRACT

Improved magnetic media comprising a non-magnetic substrate and a magnetic layer formed on at least one side of the substrate. The magnetic recording media are provided in a variety of ways with a specific type of organosilane compound serving as a lubricant and represented by the following general formula:

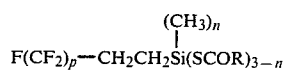

where R is a saturated or unsaturated monovalent hydrocarbon residue having from 7 to 21 carbon atoms, n is 0, 1 or 2, and p is an integer from 1 to 12. The organosilane lubricant compound may be incorporated in the magnetic layer itself, in a back coating layer, or it may constitute a layer on the magnetic layer or on the back coating layer.

11 Claims, 5 Drawing Figures

MAGNETIC RECORDING MEDIUM

BACKGROUND OF THE INVENTION

1. Field of the Invention

This invention relates to magnetic recording media having a magnetic layer on a non-magnetic support such as, for example, magnetic tapes, magnetic disks and the like, and including as a lubricant a fluorinated sulfo-ester of an organosilane compound.

2. Description of the Prior Art

Magnetic tapes are required to have various characteristics including not only a low coefficient of friction and a smooth and stable traveling performance, but also a minimal amount of powder loss and a good splicing characteristic. When magnetic tapes are used in magnetic recording and reproducing apparatus such as video tape recorders, the tapes are usually run at high speeds in physical contact with tape guides, magnetic heads, and the like. It thus becomes important that the tapes have excellent wear resistance and are capable of traveling in a stable condition over a long period. For example, when the friction coefficient on the tape surface varies at the time of the recording or reproducing, the tape will vibrate at portions of the guides or magnetic heads. This leads to the disadvantage that the recording or reproducing signal, e.g., the audio signal, varies in frequency, resulting in a sound or noise with a frequency different from the original frequency or with a vibration noise of the tape creating the so-called "Q sound" which is distinctly audible.

To overcome this defect, various attempts have been made to provide a good lubricating property to magnetic tapes. For example, it has been common practice to add solid lubricants such as molybdenum disulfide, graphite, or wax to magnetic paints which include a magnetic powder such as gamma-$Fe_2O_3$ powder and a vinyl chloride resin binder. However, these solid lubricants have the disadvantage in that they are not effective in improving the durability of the record medium and serve to deteriorate its magnetic characteristics when added in large amounts. On the other hand, higher fatty acids, higher fatty acid esters, paraffin hydrocarbons, and silicone oils (e.g., dimethyl silicone fluid, diphenyl silicone fluid, and the like) can also be used as lubricants. These lubricants, however, do not impart satisfactory durability and lubricating properties and particularly are not adequate for cassette tapes for video tape recorders. In addition, these lubricants tend to exude and bloom on the surface of the magnetic layer, causing a sticking or a stick-slip phenomenon in the magnetic tape.

It will be understood from the above that known lubricants are disadvantageous because the resulting magnetic tapes are rather poor in durability, traveling or running stability, and surface properties, and become unstable especially in still reproduction characteristics as time passes.

In U.S. Pat. No. 4,007,313, owned by the co-assignees of the present invention, there is disclosed a magnetic recording medium including a flexible non-magnetic film base and a magnetic layer which contains or is coated with an organosilicon compound characterized as a fluorinated carboxylic ester of an organosilane compound. This type of lubricant significantly reduces the static friction coefficient and the tendency of the magnetic layer to shed powder. The disclosure of the aforementioned U.S. patent is incorporated into this application by reference.

SUMMARY OF THE INVENTION

The present invention provides magnetic recording media which overcome many of the difficulties of the prior art. Specifically, the magnetic recording media have improved friction coefficients, better running or traveling performance, and improved wear resistance.

The magnetic recording medium of the present invention comprises a non-magnetic substrate and a magnetic layer formed on at least one side of the non-magnetic substrate, the medium being provided with an organosilane compound which functions as a lubricant and is represented by the formula:

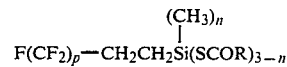

in which R represents a saturated or unsaturated monovalent hydrocarbon residue having from 7 to 21 carbon atoms, n is 0, 1 or 2, and p is an integer between 1 and 12.

The magnetic layer may be made of a magnetic powder with a binder together with the improved lubricant of the present invention, or it may be a thin magnetic metal film on which a lubricant layer is formed. As other alternatives, the improved lubricant compound may be incorporated into a back coating layer formed on the side of the magnetic substrate opposite from the magnetic layer so as to facilitate a smooth running operation of the magnetic medium. Another alternative involves providing a layer of the organosilane lubricant on the back coating layer.

Through the use of the improved organosilane compounds as lubricants, the resulting magnetic recording media exhibit not only excellent durability and a low coefficient of friction with an attendant improvement in lubricating characteristics, but also exhibit stable still reproduction and traveling characteristics.

BRIEF DESCRIPTION OF THE DRAWINGS

A further description of the present invention will be made in conjunction with the attached sheets of drawings in which FIGS. 1 through 5 inclusive are greatly enlarged, fragmentary cross-sectional views of various embodiments of the present invention.

DESCRIPTION OF THE PREFERRED EMBODIMENTS

Figure 1:
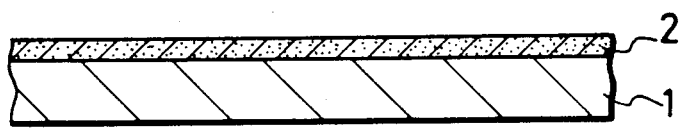

In the improved organosilane compounds of the present invention, when the number of carbon atoms represented by R is less than 7, the coefficient of friction does not become lower with a lowering of durability. On the other hand, when the number of carbon atoms exceeds 21, the organosilane compounds become less miscible with the magnetic layer, causing an increase of melting point and tending to cause blooming. In the case of the fluorine substituted hydrocarbon group, p is selected to be in the range from 1 to 12 since when p exceeds 12, the resulting organosilane compound is less compatible with the magnetic layer by reason of an increase in melting point and is thus apt to cause blooming and head staining.

The amount of organosilane lubricant used in the practice of the invention is conveniently in the range of 0.5 to 7 parts by weight per 100 parts by weight of magnetic powder (abbreviated PHP) contained in the magnetic layer when incorporated therein to develop the lubricating effect fully. In the case where the lubricant is contained in a back coating layer formed on the side where there is no magnetic layer, the amount is preferably in the range of about 0.5 to 20 parts by weight per 100 parts by weight of the binder (abbreviated PHR) which is contained in the back coating layer. If the lubricant is applied in the form of a top coating layer or a coating layer which will be described in detail hereafter, the amount is preferably in the range of from 1 to 1000 mg/m².

The preparation of the improved organosilane compounds of the present invention will now be described.

The organosilane compound is prepared by a dehydrochlorination reaction between a fluorine substituted organosilane compound of the general formula:

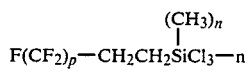

in which n and p have the same definitions as before, with a thiocarboxylic acid of the general formula RCOSH in which R has the same definition as before. This reaction is usually carried out in the presence of a hydrogen chloride collector at a temperature ranging from 0° C. to 150° C. Examples of the hydrogen chloride collector or scavenger include tertiary amine compounds such as triethylamine, pyridine, dimethylaniline, and the like. The reaction may be carried out using a suitable diluting solvent. Typical of the solvents are aromatic hydrocarbons such as benzene, toluene, xylene, and the like, aliphatic hydrocarbons such as n-pentane, cyclohexane, and the like, ether compounds such as dibutyl ether, dipropyl ether, diethyl ether, tetrahydrofuran, and the like, and chlorinated hydrocarbons such as tetrachloroethylene, trichloroethane, trichloroethylene, dichloroethane, dichloromethane, and the like.

Referring to the accompanying drawing, the same reference numerals have been used in FIGS. 1 through 5 to indicate similar parts. It will also be noted that in FIGS. 1 through 5, the dotted layer indicates that the layer contains the lubricant of organosilane compound with which the present invention is concerned.

In FIG. 1 there is illustrated a magnetic recording medium M which includes a non-magnetic base 1 and a magnetic layer 2 formed on the base 1. The magnetic layer 2 contains the improved lubricant of the present invention. Similarly, FIG. 2 shows a magnetic recording medium M which further comprises a top coating layer 3 formed on the magnetic layer 2 and composed of the improved lubricant.

Figure 2:
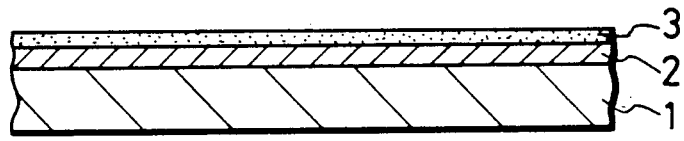
Figure 3:
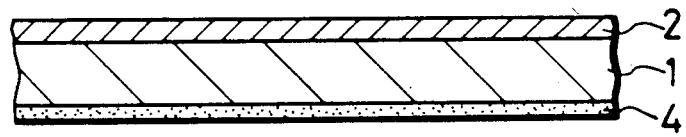

The embodiment shown in FIG. 3 is different from that shown in FIGS. 1 and 2 and includes a coating layer 4 composed of the improved organosilane lubricant of the present invention and located on the opposite side from the non-magnetic base 1 where there is no magnetic layer.

Figure 4:
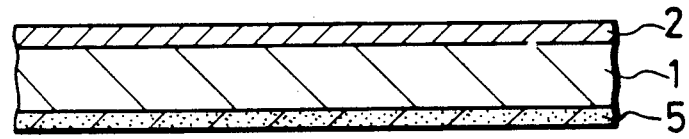

FIG. 4 is similar to FIG. 3 but includes a back coating layer 5 containing an improved organosilane lubricant and magnetic particles, also formed on the side opposite from the magnetic layer 2.

Figure 5:
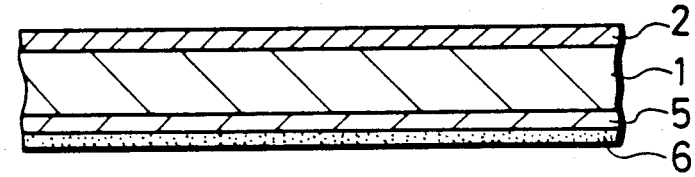

FIG. 5 shows a magnetic medium comprising the base 1, the magnetic recording layer 2 formed on one side of the base 1, the back coating layer 5 containing no lubricant and formed on the opposite side of the base 1, together with a lubricant layer 6 containing the improved lubricant of the present invention formed on the back coating layer 5.

The back coating layer 5 in these embodiments is usually provided for many purposes. For instance, when the surface roughness of the back side is controlled to a suitable degree, the traveling performance of the magnetic recording medium can be stabilized. In addition, the back coating layer can be provided for the purpose of anti-static properties. Generally the back coating layer is composed of a binder admixed with carbon black and may further comprise a non-magnetic pigment such as alpha-$Fe_2O_3$, alumina, talc or the like.

In addition to the magnetic recording media shown in FIGS. 1 through 5, magnetic media in which magnetic layers are provided on opposite sides of a base such as magnetic disks are also within the scope of the present invention. Moreover, the embodiments of FIGS. 1 through 5 can be combined in various manners including combining the embodiment of FIG. 1 with each of the embodiments of FIGS. 2 through 5, combining the embodiment of FIG. 2 with each of the embodiments of FIGS. 3 through 5, and combining the embodiment of FIG. 3 with the embodiment of FIG. 4 or 5. In other words, the lubricant used according to the present invention may be incorporated in the magnetic layer 2, and/or may be formed on the surface of the magnetic layer 2, and/or on the other surface of the layer 2.

Ferromagnetic or magnetic powders useful in the magnetic layer of the invention may be any known powders of, for example, gamma-$Fe_2O_3$, $Fe_3O_4$, mixed crystals of gamma-$Fe_2O_3$ and $Fe_3O_4$, Co-adsorbed gamma-$Fe_2O_3$ or $Fe_3O_4$, Co-doped $Fe_2O_3$ or $Fe_3O_4$, chromium dioxide, barium ferrite, various magnetic alloys such as Fe-Co, Co-Ni, Fe-Co-Ni, Fe-Co-B, Fe-Co-Cr-B, Mn-Bi, Mn-Al, Fe-Co-V and the like, and iron nitride. These ferromagnetic powders may be used singly or in combination.

The binders used in the magnetic layer include, for example, vinyl chloride-vinyl acetate copolymers, vinyl chloride-vinyl acetate-vinyl alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene, chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyral, polyvinyl acetal, cellulose derivatives, styrene-butadiene copolymers, polyester resins, phenolic resins, epoxy resins, thermosetting polyurethane resins, urea resins, melamine resins, alkyd resins, urea-formaldehyde resins and the like. Reinforcements useful in the magnetic layer include aluminum oxide, chromium oxide, silicon oxide and the like which are used singly or in combination. Moreover, known finely powdered carbon black may be used as an antistatic agent, and lecithin may be used as a dispersant.

In order to prepare a magnetic paint, organic solvents are used including, for example, ketones such as acetone, methyl ethyl ketone, methyl isobutyl ketone, cyclohexanone and the like, alcohols such as methanol, ethanol, propanol, butanol and the like, esters such as methyl acetate, ethyl acetate, butyl acetate, ethyl lactate, glycol acetate monoethyl ether and the like, glycol ethers such as ethylene glycol dimethyl ether, ethylene glycol monoethyl ether, dioxane and the like, aromatic hydrocarbons such as benzene, toluene, xylene and the like, aliphatic hydrocarbons such as hexane, heptane and the like, nitropropane, and the like. These solvents may be used singly or in combination. Non-magnetic bases on which magnetic paints using these solvents are applied are generally made, for example, of polyesters such as polyethylene terephthalate, polyolefins such as polypropylene, cellulose derivatives such as cellulose acetate, cellulose diacetate and the like, polycarbonate, polyvinyl chloride, polyimide, metals such as aluminum, copper and the like, paper, and the like.

When a top coating layer or a coating layer made of a lubricant is applied, there are used solvents which are weakly polar and low in boiling point, e.g. Freons, hexane, ethanol and the like.

Magnetic recording media to which the present invention is applicable include not only magnetic recording media of the type in which a magnetic powder is applied along with a binder to form a magnetic layer, but also magnetic recording media of the magnetic thin metal film type. For example, magnetic metals such as Co, Fe, Ni, or alloys thereof can be formed as a thin film on a non-magnetic support by a variety of physical vapor deposition processes such as vacuum deposition, ion plating and sputtering, or liquid phase plating techniques. This type of magnetic recording medium does not use any binder so it has a high magnetic flux density. Moreover, because the metal film is very thin, the media are useful for short wavelengths and high density recording purposes.

The present invention will be described in more detail by way of examples. In the following table, there is a representation of the organosilane compounds which are described in the examples.

| Compound No. | Organosilane Compound |
| --- | --- |
| 1 | $CF_3CH_2CH_2Si(SCOC_{11}H_{23})_2$ with $CH_3$ |
| 2 | $CF_3CH_2CH_2Si(SCOC_{17}H_{35})_2$ with $CH_3$ |
| 3 | $CF_3CH_2CH_2Si(SCOC_{17}H_{31})_3$ |
| 4 | $C_4F_9CH_2CH_2SiSCOC_{21}H_{43}$ with two $CH_3$ |
| 5 | $C_8F_{17}CH_2CH_2Si(SCOC_7H_{15})_3$ |
| 6 | $C_{12}F_{25}CH_2CH_2SiSCOC_9H_{19}$ with two $CH_3$ |
| 7 | $C_4F_9CH_2CH_2Si(SCOC_{13}H_{27})_2$ with $CH_3$ |

The magnetic paint used in the examples was prepared from the following composition.

| | |
| --- | --- |
| gamma-$Fe_2O_3$ (magnetic powder) | 100 parts by weight |
| Vinyl chloride-vinyl acetate-vinyl alcohol copolymer (available under the trade name of VAGH from U.C.C.) | 18 parts by weight |
| Polyurethane resin (available under the trade name of "Estan" 5702 from B. F. Goodrich Co., Ltd.) | 12 parts by weight |
| Carbon black (antistatic agent) | 0.5 part by weight |
| Lecithin (dispersant) | 1.0 part by weight |
| Lubricant | Amount indicated in each example |
| Methyl ethyl ketone (solvent) | 150 parts by weight |
| Methy isobutyl ketone (solvent) | 150 parts by weight |

The starting materials were mixed in a ball mill for 24 hours after which the mixture was passed through a filter. Immediately before application, 3 parts by weight of an isocyanate compound were added to the mixture, followed by agitation for an additional 30 minutes. The resulting mixture was applied onto a 12 micron thick polyethylene terephthalate base in a dry thickness of 5 microns, followed by magnetic orientation, drying and winding up. The wound film was treated on the surface and slit into ½-inch wide tapes for use as sample tapes.

EXAMPLES 1 to 7

The seven organosilane compounds Nos. 1 to 7 were each added in an amount of 2.0 PHP (by weight) of the magnetic powder, thereby obtaining sample tapes 1 to 7, respectively.

Comparative Examples 1 and 2

Dimethyl silicone fluid was added as a lubricant (Comparative Example 1) as well as methylphenyl silicone fluid (Comparative Example 2) and made into sample tapes.

The tapes were tested to determine several characteristics thereof, with the results shown in the following table.

| Sample | Friction Coefficient $\mu d$* | Still Reproduction Characteristic, Time** | S/N Deterioration of Image*** |
| --- | --- | --- | --- |
| Example 1 | 0.180 | over 150 minutes | −0.5 dB |
| Example 2 | 0.175 | over 200 minutes | −0.5 dB |
| Example 3 | 0.172 | over 60 minutes | −0.5 dB |
| Example 4 | 0.183 | over 200 minutes | −0.5 dB |
| Example 5 | 0.210 | over 30 minutes | −1.5 dB |
| Example 6 | 0.200 | over 30 minutes | −1.5 dB |
| Example 7 | 0.185 | over 150 minutes | −0.5 dB |
| Comparative Example 1 | 0.400 | below 5 minutes | −4.0 dB |
| Comparative Example 2 | 0.440 | below 5 minutes | −4.0 dB |

(Note)
*$\mu d$ means a dynamic friction coefficient.
**The "still reproduction characteristic" is expressed as a time before an image quality deteriorates when each tape was subjected to the still reproduction operation in a video tape recorder. A longer time results in a better characteristic.
***The term "S/N deterioration of image" means a deterioration of the signal/noise ratio of each tape relative to an initial S/N value in case where each tape was set in a video tape recorder and run by 300 cycles.

As seen from the above results, the use of the lubricants of the present invention provides a lower coefficient of friction, an improved running stability, and an improved resistance to hydrolysis. Another advantage is that the deterioration of the S/N value of an image after a number of running cycles is minimized. The tapes have improved durability with a remarkably improved still reproduction characterisitic.

EXAMPLE 8

Cobalt was vacuum deposited on a 12 micron thick polyethylene terephthalate base at a thickness of 1000 angstroms by an oblique vacuum deposition, thereby forming a magnetic layer. This magnetic layer was further coated with a Freon solution of 1% of organosilane compound No. 2 so that the amount of organosilane was 20 mg/m² as a top coating. The magnetic layer of the resulting magnetic tape had a dynamic friction coefficient, $\mu d$, of 0.190.

EXAMPLE 9

A magnetic paint as described above containing no lubricant was applied onto a 12 micron thick polyethylene terephthalate base to a thickness of 5 microns, thereby forming a magnetic layer. On the magnetic layer there was applied a Freon solution of 1% of organosilane compound No. 1 in an amount of 80 mg/m² based on the organosilane compound. The resulting magnetic tape was found to have a dynamic friction coefficient, $\mu d$, of 0.145 with respect to the magnetic layer.

EXAMPLE 10

The general procedure of Example 9 was repeated using as a lubricant compound No. 2 instead of compound No. 1. The magnetic layer of the resulting magnetic tape had a dynamic friction coefficient, $\mu d$, of 0.150.

EXAMPLE 11

The following ingredients were mixed together:

| | |
|---|---|
| Carbon black | 100 parts by weight |
| Polyurethane resin ("Estan" 5702) | 50 parts by weight |
| Epoxy resin ("Epichlon" 351, made by Dainippon Ink Co., Ltd.) | 50 parts by weight |
| Lubricant (Compound No. 3) | 2 parts by weight |
| Methyl ethyl ketone | 400 parts by weight |
| Toluene | 400 parts by weight |

Subsequently, 20 parts by weight of "Desmodule L" were added to the mixture to obtain a paint for back coating. The paint was applied to a base on the side opposite to the magnetic layer in a dry thickness of 3 microns, thereby forming a back coating layer illustrated at reference numeral 5 in FIG. 4 and providing a sample tape of Example 11.

Comparative Example 3

The paint of Example 11 from which the lubricant was absent was applied to the opposite side of the base, thereby forming a sample tape having a back coating layer.

EXAMPLE 12

The general procedure of Comparative Example 3 was repeated except that a Freon solution of 1% of organosilane compound No. 7 was applied onto the back coating layer in a thickness of 80 mg/m², thereby obtaining a sample tape of Example 12 having a coating layer (4) as shown in FIG. 5.

EXAMPLE 13

A magnetic paint as above described, without lubricant, was applied onto a 12 micron thick polyethylene terephthalate base in a thickness of 5 microns, thereby forming a magnetic layer. On the opposite side of the base there was applied a Freon solution of 1% of organosilane compound No. 1 in an amount of 2 mg/m² based on the organosilane compound.

Comparative Example 4

The procedure of Example 13 was repeated except that the coating layer (4) was not applied.

The tapes thus obtained were each tested to determine their characteristics. The test results are shown below.

| Sample | Friction Coefficient | S/N Deterioration of Image |
|---|---|---|
| Example 11 | 0.180 | −0.5 dB |
| Example 12 | 0.187 | −0.5 dB |
| Example 13 | 0.200 | — |
| Comparative Example 3 | 0.280 | — |
| Comparative Example 4 | 0.285 | — |

As will be seen from the above results, the tapes of the present invention are lower in coefficient of friction with good traveling stability and have a reduced degree of S/N deterioration of image after a number of running cycles.

The organosilane compounds of the present invention are stable with respect to time so that the initial characteristics of the magnetic recording media are maintained constant over a long period of time.

It will be evident that various modifications can be made to the described embodiments without departing from the scope of the present invention.

We claim as our invention:

1. A magnetic recording medium comprising a non-magnetic substrate and a magnetic layer formed on at least one side of said non-magnetic substrate, said medium being lubricated by the presence of an effective amount of an organosilane compound represented by the formula:

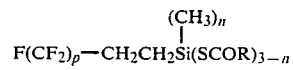

$$F(CF_2)_p-CH_2CH_2\overset{(CH_3)_n}{\underset{|}{Si}}(SCOR)_{3-n}$$

wherein R represents a saturated or unsaturated monovalent hydrocarbon residue having from 7 to 21 carbon atoms, n is 0, 1 or 2, and p is an integer from 1 to 12.

2. A magnetic recording medium according to claim 1 wherein said magnetic layer consists essentially of a magnetic powder and a binder.

3. A magnetic recording medium according to claim 2 wherein said organosilane compound is incorporated in said magnetic layer.

4. A magnetic recording medium according to claim 2 wherein said organosilane compound is present in an amount of 0.5 to 7 parts by weight per 100 parts by weight of said magnetic powder.

5. A magnetic recording medium according to claim 1, wherein said organosilane compound is present in a layer over said magnetic layer.

6. A magnetic recording medium according to claim 5 wherein the amount of said organosilane compound is in the range from 1 to 1000 mg/m$^2$.

7. A magnetic recording medium according to claim 1 wherein said magnetic layer is a thin film of magnetic metal deposited by physical vapor deposition, and said organosilane compound is present as a layer over said thin film.

8. A magnetic recording medium according to claim 7 wherein said organosilane compound is present in an amount of 1 to 1000 mg/m$^2$.

9. A magnetic recording medium according to claim 1, further including a back coating layer containing a binder and formed on the opposite side of said medium with respect to said magnetic layer, said organosilane compound being present in said back coating layer in an amount of 0.5 to 20 parts by weight per 100 parts by weight of said binder in said back coating layer.

10. A magnetic recording medium according to claim 1, further containing a back coating layer formed on the opposite side with respect to said magnetic layer, and a layer of said organosilane compound formed over said back coating layer.

11. A magnetic recording medium according to claim 10, wherein said layer of organosilane compound is present in an amount of 1 to 1000 mg/m$^2$.

* * * * *